United States Patent
Donthireddy et al.

(10) Patent No.: US 11,528,777 B2
(45) Date of Patent: Dec. 13, 2022

(54) CELLULAR MODEM INTERFACES FOR MODULARIZATION

(71) Applicant: INSEEGO CORP., San Diego, CA (US)

(72) Inventors: Vishal Donthireddy, San Diego, CA (US); Todd Conklin, San Diego, CA (US); Hinh Nguyen, San Diego, CA (US)

(73) Assignee: INSEEGO CORP., San Diego, CA (US)

( * ) Notice: Subject to any disclaimer, the term of this patent is extended or adjusted under 35 U.S.C. 154(b) by 0 days.

(21) Appl. No.: 17/203,675

(22) Filed: Mar. 16, 2021

(65) Prior Publication Data

US 2022/0304113 A1 Sep. 22, 2022

(51) Int. Cl.
*H04W 88/08* (2009.01)
*H04L 12/28* (2006.01)

(52) U.S. Cl.
CPC ......... *H04W 88/08* (2013.01); *H04L 12/2801* (2013.01)

(58) Field of Classification Search
CPC ............................. H04W 88/08; H04L 12/2801
USPC ........................................................ 375/222
See application file for complete search history.

(56) References Cited

U.S. PATENT DOCUMENTS

| | | | | |
|---|---|---|---|---|
| 4,825,448 A * | 4/1989 | Critchlow | .............. | H03D 7/165 375/222 |
| 8,289,917 B1 * | 10/2012 | Koivisto | ............... | H04L 1/0026 370/329 |
| 2007/0102830 A1 * | 5/2007 | Muto | ................... | H05K 1/0219 257/784 |
| 2010/0312418 A1 * | 12/2010 | Kraft | .................... | H05K 5/0026 701/1 |
| 2017/0117876 A1 * | 4/2017 | Youn | .................... | H05K 1/0259 |
| 2018/0063851 A1 * | 3/2018 | Abraham | .............. | H04W 16/14 |

* cited by examiner

*Primary Examiner* — Kevin M Burd
(74) *Attorney, Agent, or Firm* — Sheppard, Mullin, Richter & Hampton LLP; Hector A. Agdeppa; Daniel N. Yannuzzi (57) ABSTRACT

A cellular modem interface device may comprise a cellular module. The cellular module may comprise wireless communication circuitry. The cellular modem interface device may further comprise a first connector module. The first connector module may comprise a first plurality of connectors associated with a first plurality of interfaces, wherein the first plurality of connectors includes at least one connector for a power supply and at least one interface of the first plurality of interfaces is associated with slow data speeds. The cellular modem interface device may further comprise a second connector module. The second connector module may comprise a second plurality of connectors associated with a second plurality of interfaces, wherein at least one interface of the second plurality of interfaces is associated with fast data speeds.

20 Claims, 8 Drawing Sheets

CELLULAR MODEM INTERFACES FOR MODULARIZATION

TECHNICAL FIELD

The present disclosure relates generally to wireless technologies, and in particular, to cellular modem interfaces.

DESCRIPTION OF RELATED ART

Wireless communications have become ubiquitous in today's society as wireless systems capabilities increase so does the adoption rate of wireless technologies. Today, wireless technologies are fast overtaking and replacing conventional wired technologies and infrastructure.

The 5G broadcast transmission protocol devised by the 3rd Generation Partnership Project (3GPP) represents the latest in wireless communication technologies promising to revolutionize wireless data communications. 5G high-band technologies utilize extremely high frequency (EHF), or millimeter wave, that enables connectivity significantly improved over the previous generation 4G networks. 5G provides greater spectral efficiency and greater spectrum pathways to achieve increased throughput for each part of the spectrum.

While millimeter wave frequencies allow greater bandwidth, these frequencies suffer from decreased range as compared to their longer wavelength, lower frequency predecessors. Millimeter wave frequencies also suffer from greater attenuation when traveling through walls, windows and other structural components. Accordingly, 5G networks typically require a higher density of transmitters as compared to 4G network architectures.

BRIEF SUMMARY OF THE DISCLOSURE

According to various implementation of the disclosed technology, a cellular modem interface device may comprise a cellular module. The cellular module may comprise wireless communication circuitry. The cellular modem interface device may further comprise a first connector module. The first connector module may comprise a first plurality of connectors associated with a first plurality of interfaces, wherein the first plurality of connectors includes at least one connector for a power supply and at least one interface of the first plurality of interfaces is associated with slow data speeds. The cellular modem interface device may further comprise a second connector module. The second connector module may comprise a second plurality of connectors associated with a second plurality of interfaces, wherein at least one interface of the second plurality of interfaces is associated with fast data speeds.

In some embodiments, the cellular module further comprises a plurality of antenna, wherein the plurality of antenna are associated with at least one of: LTE, WCDMA, GPS, GNSS, 3G, 4G, or 5G frequencies.

In some embodiments, the cellular module further comprises a 5G modem.

In some embodiments, the first plurality of interfaces includes a SLIC interface and a UART interface.

In some embodiments, the second plurality of interfaces includes a PCIe interface and a USB interface.

In some embodiments, the second plurality of connectors includes at least one connector corresponding with at least one interface associated with a static signal.

In some embodiments, the second plurality of interfaces includes at least two interfaces associated with differential signaling and at least one interface associated with a static signal. The second plurality of connectors includes at least two connectors corresponding with the at least two interfaces associated with differential signaling and at least one connector corresponding with the at least one interface associated with the static signal. The at least one connector is arranged between the at least two connectors.

In some embodiments, the first connector module further comprises a first plurality of ground guards and the second connector module further comprises a second plurality of ground guards.

In some embodiments, the first connector module further comprises a first reference ground and the second connector module further comprises a second reference ground.

In some embodiments, a connector module may comprise a plurality of connectors for a plurality of interfaces, wherein the plurality of connectors are arranged based on factors associated with the plurality of interfaces, wherein the factors include a type of signaling associated with the plurality of interfaces and a type of signal associated with the plurality of interfaces.

In some embodiments, the plurality of connectors includes a first connector for a power supply and at least one second connector for at least one interface of the plurality of interfaces, wherein the at least one interface is associated with slow data speeds.

In some embodiments, the plurality of connectors includes a first connector for low voltage power and at least one second connector for at least one interface of the plurality of interfaces, wherein the at least one interface is associated with fast data speeds.

In some embodiments, the plurality of interfaces includes a SLIC interface and a UART interface.

In some embodiments, the plurality of interfaces includes a PCIe interface and a USB interface.

In some embodiments, the plurality of connectors includes at least two connectors for at least two interfaces associated with differential signaling. The plurality of connecters further includes at least one connector for at least one interface associated with a static signal. The at least one connector is arranged between the at least two connectors.

In some embodiments, the connector module further comprises a plurality of ground guards.

In some embodiments, the connector module further comprises a reference ground.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting the breadth, scope, or applicability thereof. It should be noted that for clarity and ease of illustration these drawings are not necessarily made to scale.

The figures are not exhaustive and do not limit the disclosure or the disclosed embodiments to the precise form disclosed.

DETAILED DESCRIPTION OF THE EMBODIMENTS

The introduction of 5G technologies has enabled improved connectivity over previous 4G technologies. For example, 5G technologies can provide data speeds on the order of gigabites, enabling what can be considered broadband services over cellular networks. With the improved data speeds offered by 5G technologies over previous 4G technologies, various end products that rely on high data speeds can utilize 5G cellular networks via cellular modules (e.g., 5G modems) instead of, for example, wired broadband networks. As such, the improved data speeds provided by 5G technologies enables a broader range of end products to utilize cellular networks than the range of end products previously enabled by 4G technologies. The various end products that rely on high data speeds may also rely on high speed interfaces (e.g., PCIe, USB 3.1, etc.) to support the high data speeds. As such, the broader range of end products utilizing the improved data speeds provided by 5G technologies leads to a broader range of interfaces to support the improved data speeds provided by 5G technologies. Thus, with the introduction of 5G technologies, a broader range of interfaces may be utilized to support the high data speeds available through cellular modules.

With a broader range of interfaces available to support high data speeds available through cellular modules, end products may come in increasing variations of interfaces and cellular modules. These increasing variations may present various challenges in terms of cost and efficiency. For example, designing an end product to use a particular interface and a particular cellular module may be costly as design costs, regulatory certification costs, and manufacturing costs cannot be shared with other end products. Furthermore, the end product may be inefficient as the range of available frequencies available to the particular cellular module may be limited. Thus, there is a need for a cellular modem interface module to accommodate a broad range of interfaces and a broad range of cellular modules.

Accordingly, various embodiments of the present disclosure are directed to a cellular modem interface module that allows for multiple interfaces (e.g., PCIe, USB, GPIOs, SLIC, UART, etc.) to be connected with one or more cellular modules (e.g., 5G modem, etc.).

By providing for multiple interfaces to be connected with one or more cellular modules, a cellular modem interface module allows for different end products with different form factors and using different interfaces to connect with different cellular modules. In this way, the cellular modem interface module provides advantages with regards to cost and efficiency. For example, the cellular modem interface module may advantageously reduce design costs, regulatory certification costs, and manufacturing costs by providing a platform that can be utilized in various end products. Furthermore, the cellular modem interface module may advantageously facilitate use of broad frequency ranges across different wireless technologies (e.g., GPS, WCDMA, LTE, 5G, etc.).

In some embodiments, design of the cellular modem interface module may be based on various factors. For example, based on manufacturing cost and spatial efficiency, a number of connectors for the different interfaces in the cellular modem interface may be reduced. Furthermore, the different interfaces may be arranged in various orders within the connectors to maintain signal integrity among the different interfaces.

{Back Up Claims?}

Figure 1:
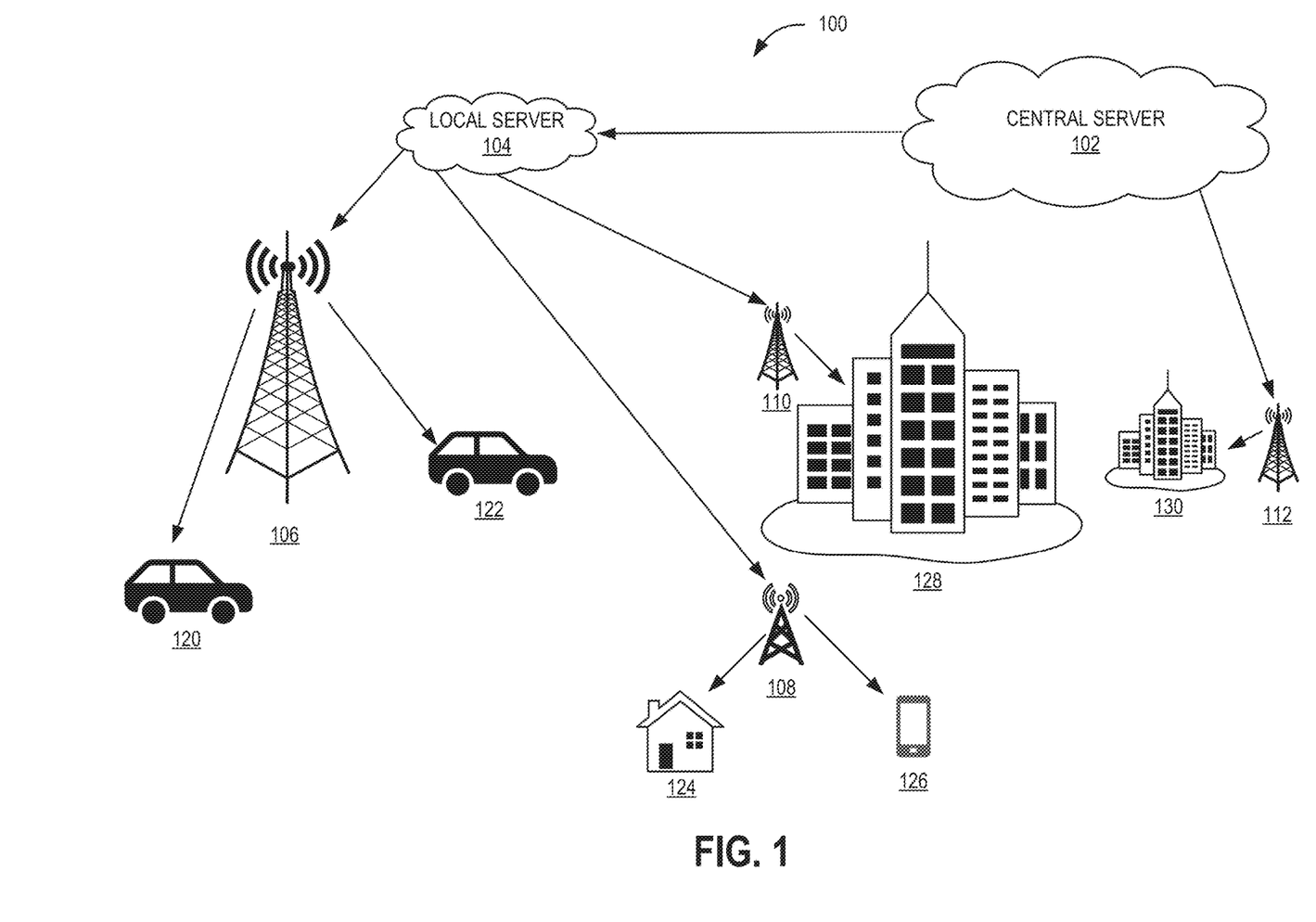
FIG. 1 illustrates an example 5G network with which various embodiments of the present disclosure may be implemented.

Before describing example embodiments in detail, it is useful to describe an example environment with which various embodiments may be implemented. FIG. 1 illustrates an example 5G network 100 in which or with which various embodiments of the present disclosure may be implemented. 5G is a standard promulgated by the International Telecommunication Union (ITU) and the $3^{rd}$ Generation Partnership Project (3GPP), with the ITU setting the minimum requirements for 5G compliance, and the 3GPP creating the corresponding specifications. 5G is a successor to the 4G/Long Term Evolution (LTE) standard, and refers to the fifth generation of wireless broadband technology for digital cellular networks. 5G is intended to replace or augment 4G/LTE. Touted advantages of 5G include, for example, up to 10 times faster download and upload speeds, along with much-reduced latency (also referred to as "air latency," i.e., the roundtrip time it takes for a device to communicate with the network).

The frequency spectrum of 5G includes three bands. The first band can be referred to as the low-band spectrum, i.e., the sub-1 GHz spectrum. This low-band spectrum is the primary band used by U.S. wireless carriers with data speeds reaching about 100 Mbps. The second band can be referred to as the mid-band spectrum, i.e., the sub-6 GHz spectrum, which provides lower latency (e.g., 4-5 ms) and greater data speeds (e.g., up to 1 Gbps) relative to the low-band spectrum. However, mid-band signals are not able to penetrate structures, such as buildings, as effectively as low-band signals. The third band can be referred to as the high-band spectrum, or millimeter wave (mmWave), and operates between 25 GHz and 100 GHz. The term millimeter is associated with this high-band spectrum because wavelengths in this portion of the spectrum range from, e.g., 1-10 mm. Devices operating on this third band can deliver the highest data speed (e.g., up to 10 Gbps) and the lowest latency (e.g., 1 ms). However, its coverage area (the distance it can transfer data) is less than that of the low-band and mid-band spectrums, and building penetration decreases as the frequency increases. Use of mmWave technology is nevertheless desirable because the low-band and mid-band portions of the spectrum are already heavily congested with, e.g., TV and radio signals, as well as 4G/LTE traffic, and so long as the coverage area can be limited, the benefits of mmWave technology can still be realized.

With reference now to FIG. 1, a mobile network's RAN may include various infrastructure, e.g., base stations/cell towers, masts, in-home/in-building infrastructure, and the like. The RAN allows users of mobile devices, e.g., smartphones, tablet computers, laptops, vehicle-implemented communication devices (e.g., vehicles having vehicle-to-vehicle (V2V) capabilities), to the core network. The example of FIG. 1 illustrates a plurality of 5G small base stations or small cells and 5G macro base stations or macro cells, i.e., 5G macro cells 106, 110, and 112, and 5G small cell 108.

Macro cells can refer to (tall, high-powered) "macro" base stations/cell towers that are able to maintain network signal strength across long/large distances. 5G macro cells may use multiple input, multiple output (MIMO) antennas that may have various components that allow data to be sent and/or received simultaneously. In the example 5G network 100 of FIG. 1, 5G macro cell 106 may provide wireless broadband coverage/communications to vehicles 120 and 122. 5G macro cell 110 may provide broadband service to an area, such as a city or municipality 128. Likewise, 5G macro cell 112 may provide broadband coverage to an area, such as a city or municipality 130. The MIMO antennas used by 5G macro cells may comprise large numbers of antenna elements, which can be referred to as massive MIMO, whose size may be comparable to, e.g., 3G and/or 4G base station antennas.

5G small cells can refer to wireless transmitters/receivers implemented as micro base stations designed to provide coverage to areas smaller than those afforded coverage by 5G macro cells, e.g., on the order of about 100 m to 200 m for outdoor 5G small cells. Indoor 5G small cell deployments may be on the order about 10 m. 5G small cells can be mounted or integrated into/onto street lights, utility poles, buildings, etc., and like 5G macro cells, may also leverage massive MIMO antennas. In the example 5G network 100 of FIG. 1, 5G small cell 108 provides broadband coverage to a house 124 and smartphone 126.

The core network may comprise the mobile exchange and data network used to manage the connections made to/from/via the RAN. As illustrated in FIG. 1, the core network of 5G network 100 may include central server 102 and local server 104. Central server 102 is shown to effectuate broadband service to municipality 130 by way of 5G macro cell 112. Central server 102 may also operatively connect to local server 104, which in turn, provides broadband connectivity by way of 5G macro cells 106 and 110, as well as 5G small cell 108. The use of distributed servers, such as local server 104 can improve response times, thereby reducing latency. The core network may leverage network function virtualization (instantiation of network functions using virtual machines via the cloud rather than hardware) and network slicing (segmentation of 5G network 100 in accordance with a particular application, industry, or other criteria) to provide these lower response times, and provide faster connectivity.

Figure 2:
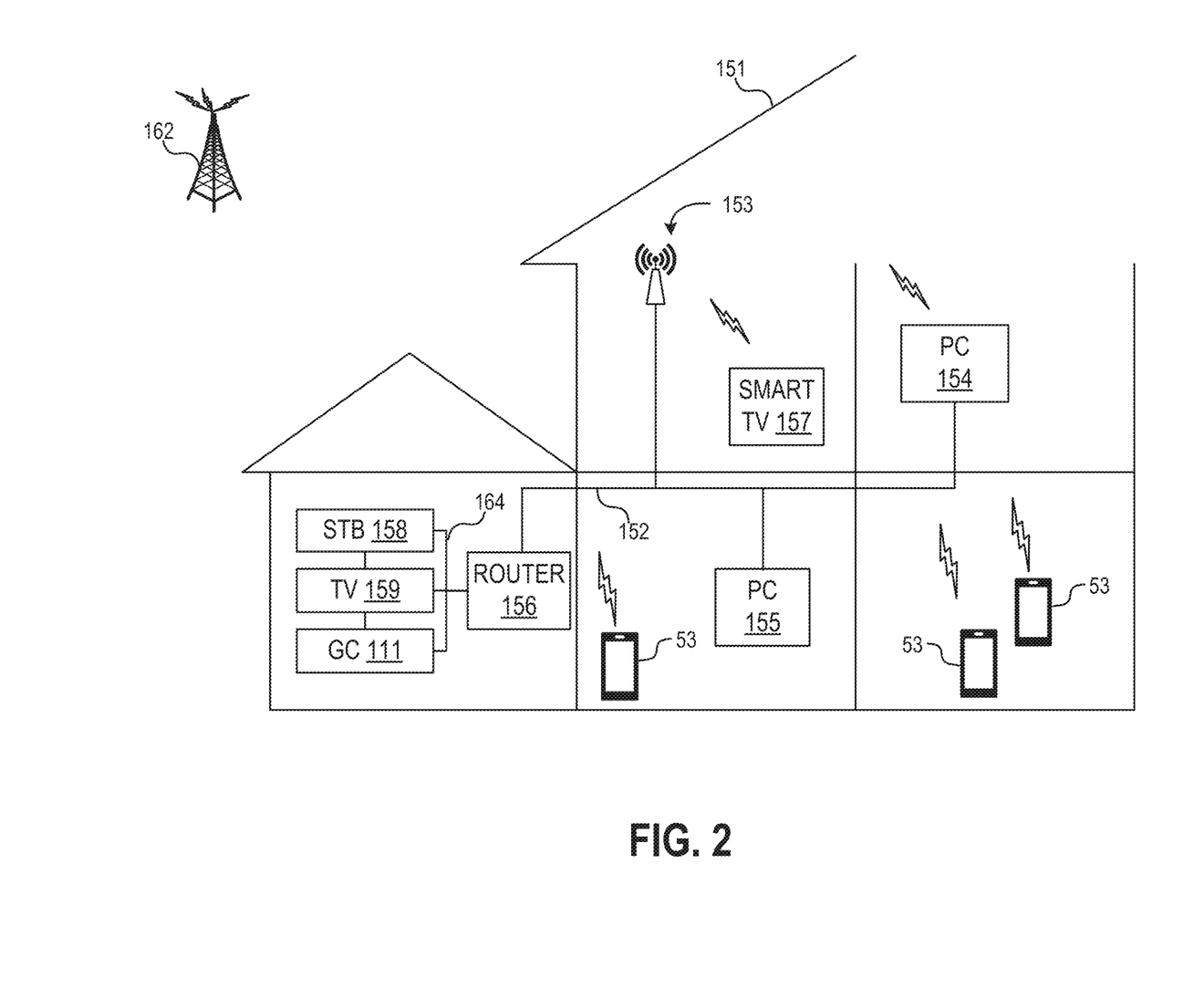
FIG. 2 illustrates an example of an in-home wireless and wired network with which various embodiments may be implemented.

FIG. 2 illustrates an example of an in-home wireless and wired network with which various embodiments may be implemented. The example of FIG. 2 shows a wired and wireless network operating within a building 151 (e.g., house 124 or a building in municipality 128 or municipality 130). Building 151 may include a house, and apartment, an office suite or building, a warehouse, a retail establishment or other commercial, residential or government building.

This example includes a wired network implemented using a wired communications medium 152. In some embodiments, the wired communications medium might be a fiber optic cable system, an Ethernet cable system, a coaxial cable system, a power line system, or other physical communications medium. A wireless access point 153 Is included in this example to provide a wireless network over which various devices within the building 151 may communicate wirelessly. For example, wireless access point 153 can function as a Wi-Fi router to create a Wi-Fi network over which the various devices can communicate. Wireless access point 153 may also include functionality to communicate with an external network such as, for example, through a 4G or 5G base station 162 (e.g., a macro cell or small cell). In this example, wireless access point 153 also includes a router so that it can communicate over wired communications medium 152.

This example also illustrates a number of devices that can communicate wirelessly or over wired communications medium 152 as devices on the network. This example includes a number of smart phones 53, a smart TV 157 and a personal computer (PC) 154 that can communicate wirelessly with wireless access point 153. This example also illustrates PC 154, a PC 155 and a router 156 that can communicate with wireless access point 153 via wired communications medium 152. Router 156 can further communicate with a set-top box 158, a television 159 and a gaming console 111 via a wired communications interface 164.

In some implementations, wireless access point 153 may be implemented as a Wi-Fi router for communications with devices within or within proximity of the outside of building 151. Wireless access point 153 may also include a modem such as a 5G modem to communicate with the Internet or other third parties via the 5G communication network. In this manner, the devices in communication with the Wi-Fi or ethernet router of wireless access point 153 may be connected to the Internet or other third parties.

Although various embodiments may be described in terms of this example environment, the technology disclosed herein can be implemented in any of a number of different environments.

Figure 3:
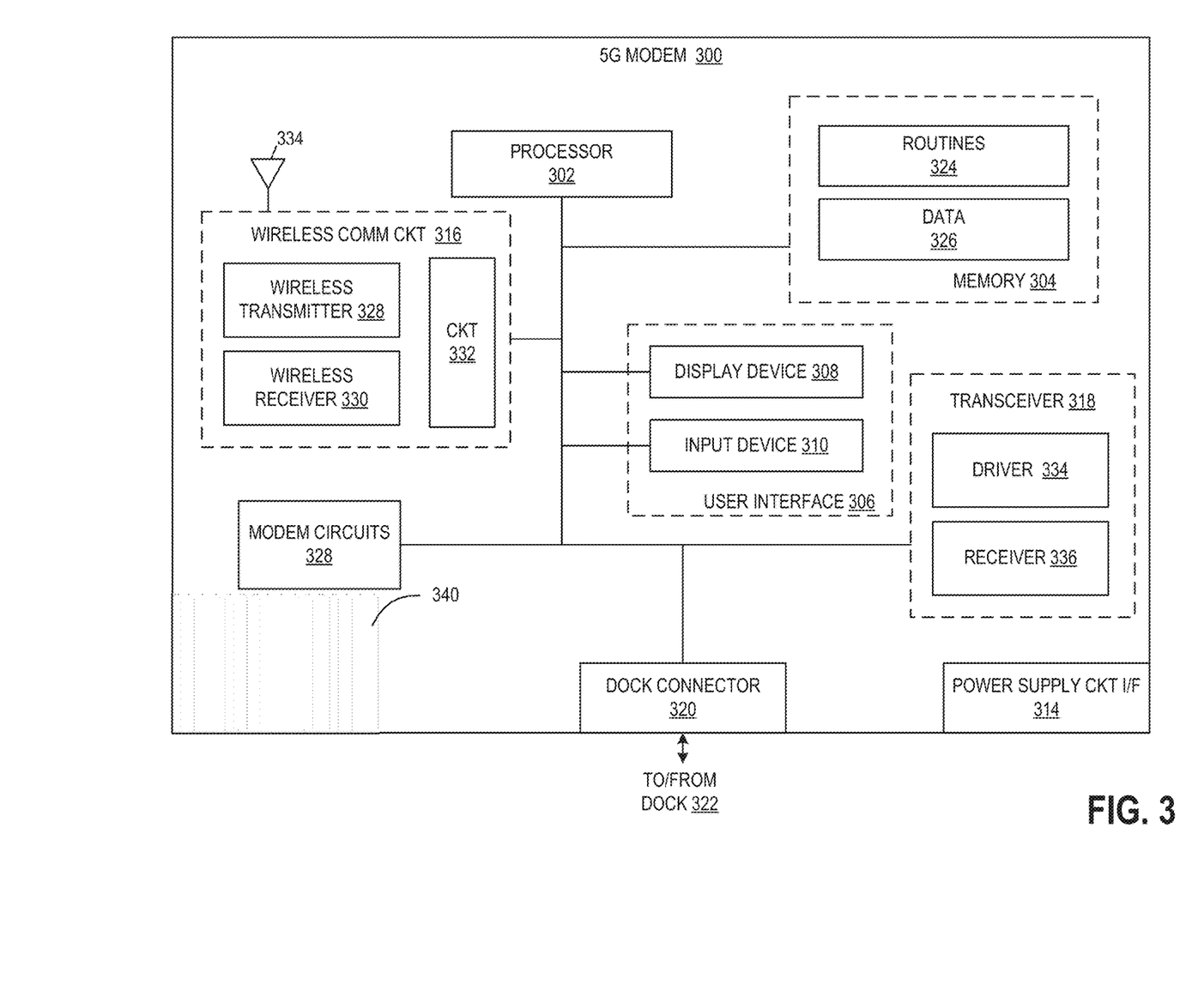
FIG. 3 illustrates a block diagram of an example 5G radio module in accordance with one embodiment.

FIG. 3 is a schematic representation an example radio module, e.g., a 5G modem 300. 5G modem 300 may include a processor 302, a memory 304, user interface(s) 306 which may be in the form of a display device 308 and an input device 310, modem circuits 312, power supply circuit(s) 314, a 5G wireless communication circuit 316 a transceiver 318, and a dock connector 320.

Processor 302 may be implemented as a dedicated or general-purpose processor or combination of processors or computing devices to carry out instructions and process data. For example, processor 302 may access memory 304 to carry out instructions, including routines 326, using data including data 326. Processor 302 may include one or more single core, dual core, quad core or other multi-core processors. Processor 302 may be implemented using any processor or logic device, such as a complex instruction set computer (CISC) microprocessor, a reduced instruction set computing (RISC) microprocessor, a very long instruction word (VLIW) microprocessor, a processor implementing a combination of instruction sets, or other processing device. Other modem circuits 328 may be provided to perform other modem functions.

Memory 304 includes memory locations for storing instructions or other routines 324 and data 326. Memory 304 may be implemented using any machine-readable or computer-readable media to store data and instructions, including volatile and nonvolatile memory. Memory 304 may be implemented, for example, as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory or other solid state memory, polymer memory, ferroelectric memory, silicon-oxide-nitride-oxide-silicon (SONOS) memory, holographic or other optical storage, or other memory structures. Although memory 304 is illustrated as a separate component in FIG. 3, part or all of memory 304 can be implemented on the same integrated circuit as processor 302 or otherwise form part or all of embedded memory of processor 302.

Wireless communication circuit 316 may include a wireless transmitter 328, a wireless receiver 330, communication circuitry 332 and antenna 334 (to effectuate communications between 5G modem 300 and a serving GnB(s). Communication circuitry 332 may be implemented as a communications processor using any suitable processor logic device to provide appropriate communications operations such as, for example, baseband processing, modulation and demodulation, and other wireless communication operations. Where certain operations such as modulation and demodulation are performed in the digital domain, analog-to-digital and digital-to-analog conversion circuitry can be included to provide the appropriate interfaces between communication circuitry 332 and wireless transmitter 328/wireless receiver 330.

Transceiver 318 may be included to provide a hardwired communications interface between 5G modem 300 and dock 322 (which as will be described below) can be used to provide connectivity to a networking element, e.g., a Wi-Fi router connected to dock 322, and Ethernet router connected to dock 322. As noted above, dock 322 may have networking functionality integrated therein, e.g., dock 322 may be a Wi-Fi router, an Ethernet router, etc. The illustrated example includes a driver circuit 334 to transmit data to dock and a receiver circuit for 336 to receive data from dock 322 or one or more network elements operatively connected to dock 322. Using transceiver 318, data received from the 5G network intended for devices served by, e.g., a Wi-Fi router, can be transferred from 5G modem 300 to that Wi-Fi router. Similarly, transceiver 318 can receive data from devices served by the Wi-Fi router, and provide that data to other components of 5G modem 300 for processing and transmission to the 5G network.

The user interface 306 in this example may include a display device 308 and an input device 310. Display device 308 may include, for example, one or more LEDs, display screens, touch screens, or other alphanumeric displays, or other display devices to communicate data or other information to a user. Input device 310 may include buttons, a keypad, a touchscreen display, or other input device to accept input from a user. Display device 308 and input device 310 may include attendant circuitry such as drivers, receivers and processing or control circuitry to enable operation of the devices with 5G modem 300.

Although illustrated as part of 5G modem 300, user interface 306 may be implemented as part of dock 322. User interface 306 can provide a user interface to control operation of the entire modem/dock unit (and/or any networking elements or devices connected to dock 322), rather than just 5G modem 300. It should be noted that user interface 306 is optional, and 5G modem 300 need not have a user interface. A user of 5G modem 300 may interact, e.g., control or configure 5G modem 300 via a computing device operatively connected to 5G model 300 through wireless communications circuit 316. For example, user interface 306 may also be implemented using a separate device such as an application running on a smart phone, tablet, or other computing system. Accordingly, user interface 306 may include a wired or wireless communication interface to communicate with the smart phone, tablet or computing system running the application.

Power supply circuit(s) interface (I/F) 314 can be included to receive power provided from an external power source such as, for example, an AC mains circuit of the building or power over Ethernet (PoE) through Ethernet cabling vis-à-vis dock 322.

Moreover, 5G modem 300 may include a heat sink 340 internally integrated therein. It should be understood that the example heat sink 340 as illustrated is not necessarily representative of size/placement in 5G modem 300. That is, heat sink 340 may be larger, e.g., to cover, surround, or abut one or more heat-generating elements of 5G modem 300, e.g., wireless communications circuit 316, processor 302, power supply 314, etc. In some embodiments, multiple heat sinks may be utilized (not shown) to dissipate heat from heat-generating elements of 5G modem 300. In some embodiments, heat sink 340 may be sized and placed proximate to/atop the entirety of the elements/components of 5G modem 300. As is understood by those of ordinary skill in the art, a heat sink, such as heat sink 340 increases heat flow away from a heat-generating element or device by increasing that element's surface area.

In some embodiments, heat sink 340 may comprise or operatively connected to a conductor (also referred to as a thermal interface material) made of heat conducting material (s), e.g., aluminum alloys, copper, and/or other material(s) known now or in the future. Such a conductor may be used to move heat from a heat-generating element away from the heat-generating element to protrusions, typically fins that make up heat sink 340. In this way, the heat can be dissipated to the surrounding air within 5 g Modem 300. The fins may vary in terms of height, width, configuration, and/or separation between adjacent fins depending on the amount of cooling needed/desired in 5G modem 300. Heat sink 340 as currently illustrated comprises a passive heat sink, although in other embodiments, heat sink 340 may be implemented as an active heat sink with, e.g., an attached fan (not shown) to assist in heat dissipation, or a hybrid heat sink.

Dock connector 320 may be a data connector, allowing for the exchange of data between 5G modem 300 and dock 322 (or other network devices connected to dock 322). Dock connector 320 may be configured in accordance with variety of different standards, e.g., mini Serial AT Attachment (mSATA), M.2, etc. That is, dock connector 320 may comprise various conductors (ground(s)/active data line pairs/etc.). Dock connector 320 can be configured, physically, in different ways to accommodate desired connectability to dock 322. For example, dock connector 320 may be oriented vertically allowing 5G modem 300 to be placed atop dock 322. It should be understood that in some embodiments dock connector 320 is a universal dock connector, in that it may be used to connect to multiple docks, e.g., an indoor dock, an outdoor dock, an indoor/outdoor dock configured with specific functionality, e.g., Wi-Fi-specific dock, Ethernet-specific dock, and so on. However, due to the sensitivity of 5G communications with respect to placement/location of a radio module relative to GnB, the antenna connector(s) for 5G modem 300 may be oriented in different ways depending on the orientation of antennas, e.g., antenna 334, therein, which can be driven by antenna performance.

Figure 4:
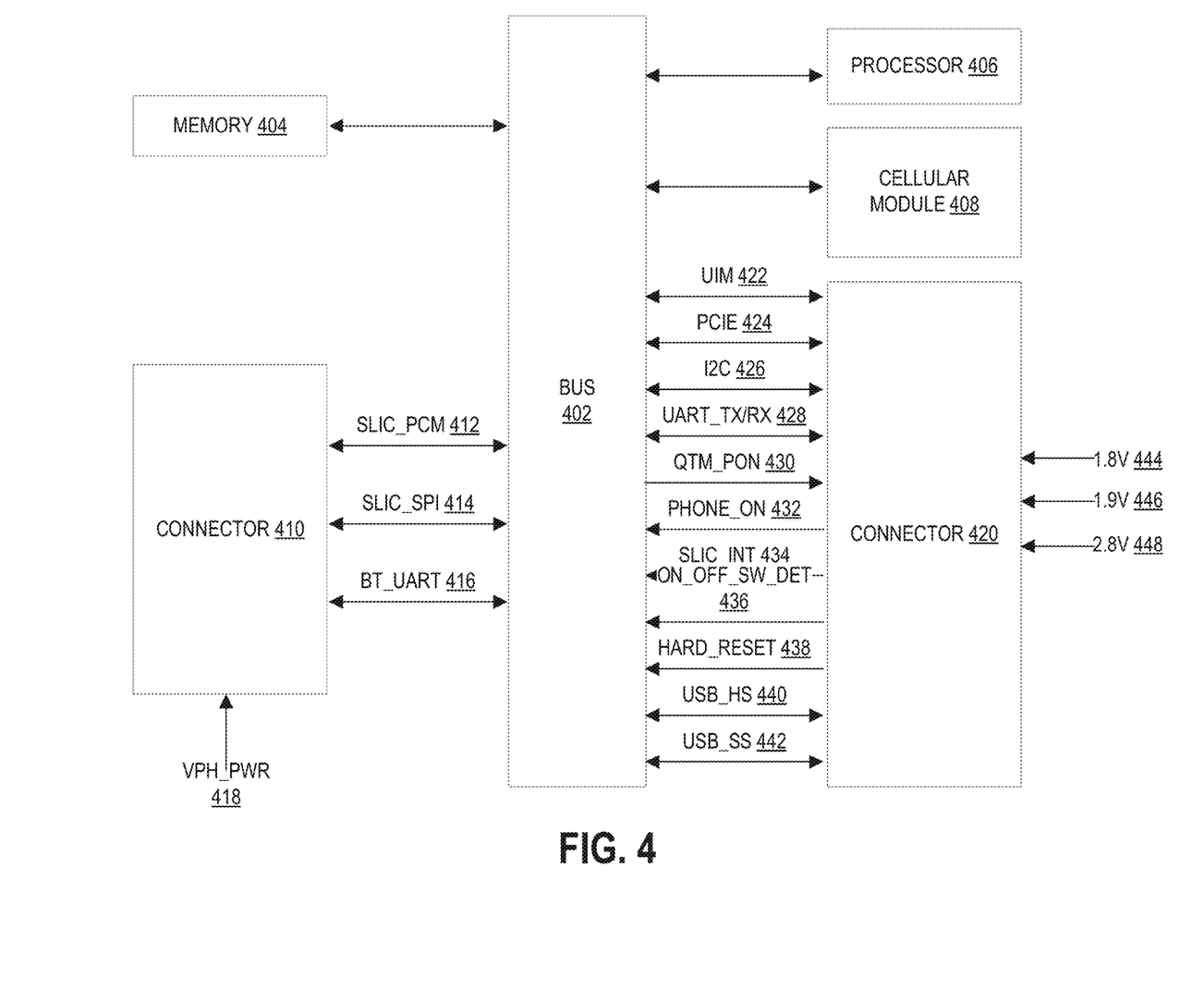
FIG. 4 illustrates a block diagram of an example cellular modem interface module in accordance with one embodiment.

FIG. 4 illustrates a block diagram of an example cellular modem interface module that allows for multiple interfaces (e.g., PCIe, USB, GPIOs, SLIC, UART, etc.) to be connected with one or more cellular modules (e.g., 5G modem, etc.). As illustrated in FIG. 4, the example cellular modem interface can include a bus 402 to which various components in the example cellular modem interface can be coupled. The example cellular modem interface can include a memory 404 and a processor 406 coupled to the bus 402. The memory 404 can be random access memory (RAM) or read only memory (ROM) or other storage devices for storing information and instructions for the processor 406. The example cellular modem interface can include a cellular module 408. The cellular module 408 can include wireless transmitters and/or wireless receivers associated with various wireless technologies, including GPS, WiFi, 3G, 4G, and 5G. The cellular module 408 can include the wireless transmitters and/or wireless receivers for these various wireless technologies in various combinations. In some embodiments, the cellular module 408 can support multiple antennas (or antenna ports) associated with various bands and frequencies, allowing broad access to various wireless technologies. In some embodiments, the cellular module 408 can support over four antenna ports. An example table of antennas included in a cellular module 408 is provided in TABLE 1, below.

TABLE 1

| ANTENNA PORT | BAND/TECH SUPPORT | FUNCTION |
| --- | --- | --- |
| ANT0 | LTE, 5G SUB 6, WCDMA, GPS/GNSS | LTE Primary (+5G sub6) |
| ANT1 | LTE, 5G SUB 6, WCDMA, GPS/GNSS | LTE Diversity (+5G sub6) |
| ANT2 | LTE, 5G SUB 6 | LTE(+5G sub6) |
| ANT3 | LTE, 5G SUB 6 | LTE(+5G sub6) |
| ANT4 | LTE, 5G SUB 6 | LTE UHB/5G Sub6 |
| ANT5 | LTE, 5G SUB 6 | LTE UHB/5G Sub6 |
| ANT6 | LTE, 5G SUB 6 | LTE UHB/5G Sub6 |
| ANT7 | LTE, 5G SUB 6 | LTE UHB/5G Sub6, TDD LTE:(+5G sub6) |
| ANT8 | LTE, 5G SUB 6 | LTE:(+5G sub6) |

In some embodiments, the cellular module 408 can include, among support for various other wireless technologies, a 5G modem, such as the 5G modem 300 illustrated in FIG. 3. It should be understood that many variations are possible.

As alluded to above, design of the cellular modem interface module can be based on various factors. The factors can include costs, such as design costs, manufacturing costs, and regulatory certification costs. Design costs can be associated with designing different cellular modem interface modules for different configurations of interfaces and cellular modules. Design costs can rise as the number of different cellular modem interface module designs rises, and design costs can be reduced by designing a cellular modem interface module that accommodates a broad range of interfaces and cellular modules. Manufacturing costs can be associated with fabricating cellular modem interface modules. Similar to design costs, manufacturing costs can rise with the number of different cellular modem interface module designs. Accordingly, manufacturing costs can be reduced by designing a cellular modem interface module that can be shared among different end products that use different interfaces and different cellular modules. Regulatory certification costs can be associated with certifying a design for a cellular modem interface module. Similar to design costs and manufacturing costs, regulatory certification costs can rise with the number of different cellular modem interface module designs. Accordingly, regulatory certification costs, as well as design costs and manufacturing costs, can be reduced by designing a cellular modem interface module that accommodates a broad range of interfaces and cellular modules.

The factors can also be associated with maintaining signal integrity and can include, for example, a type of signaling used by an interface and a type of signal communicated by an interface. In some cases, different interfaces can use different types of signaling, such as differential signaling and single-ended signaling. For example, PCIe and USB are examples of interfaces that use differential signaling. As differential signaling can involve multiple signals and the difference between the multiple signals, in some cases, an interface that uses differential signaling can be susceptible to interference from nearby interfaces where noise from the nearby interfaces affect the multiple signals differently. For example, placing two interfaces that use differential signaling adjacently may cause interference for the two interfaces as noise from one interface may interfere with a signal in the other interface, and vice-versa. An interface that uses single-ended signaling can also be susceptible to interference from nearby interfaces. In some cases, different interfaces can communicate different types of signals, such as dynamic signals and static signals. For example, PCIe and USB are examples of interfaces that use dynamic signals. Toggle switches and reset switches are examples of interfaces that use static signals. Dynamic signals can involve regular or intermittent changes in the signals. Static signals can involve maintaining a consistent signal for a period of time. As such, an interface that uses static signals may be less likely to interfere with nearby interfaces than an interface that uses dynamic signals.

The factors can also include various aspects of signal integrity, such as crosstalk, ringing, distortion, ground bounce, signal loss, signal reflection, and power supply noise. In some cases, different interfaces can be more susceptible or less susceptible these various aspects. Different configurations of different interfaces can increase or can reduce these various aspects. For example, PCIe interfaces and USB interfaces both communicate dynamic signals using differential signaling. In this example, a configuration that places PCIe interfaces near USB interfaces may increase a likelihood of crosstalk between the PCIe interfaces and the USB interfaces. As another example, SLIC interfaces can be less susceptible to power supply noise. In this example, a configuration that places SLIC interfaces closer to a power supply than other interfaces may reduce a likelihood of power supply noise. It should be understood that many variations are possible.

As illustrated in FIG. 4, the example cellular modem interface can include a first connector module 410 and a second connector module 420. The first connector module 410 and the second connector module 420 illustrate example implementations of the various factors associated with design of a cellular modem interface module as described herein. The first connector module 410 can include connections for SLIC interfaces, including SLIC_PCM 412 and SLIC_SPI 414. The first connector module 410 can also include connections for UART interfaces, including BT_UART 416. The first connector module 410 also includes a connection for a power supply, VPH_PWR 418. The SLIC interfaces and UART interfaces may be less susceptible to power supply noise than other interfaces. Accordingly, the first connector module 410 can include the SLIC interfaces and UART interfaces with the connection for the power supply. In some cases, interfaces associated with slow data speeds can be less susceptible to power supply noise, and the first connector module 410 can include slow data speed interfaces with the power supply. Other interfaces that may be more susceptible to power supply noise can be included in a separate connector, such as the second connector module 420. In some cases, interfaces associated with fast data speeds can be more susceptible to power supply noise, and the second connector module 420 can include fast data speed interfaces.

The second connector module 420 can include connections for UIM interfaces (e.g., UIM 422), PCIe interfaces (e.g., PCIE 424), I2C interfaces (e.g., I2C 426), UART interfaces (e.g., UART_TX/RX 428), and USB interfaces (e.g., USB_HS 440, USB_SS 442). The second connector module 420 can also include connections for interfaces that communicate static signals (e.g., QTM_PON 430, PHONE_ON 432, SLIC_INT 434, ON_OFF_SW_DET 436, HARD_RESET 438). In this example of the second connector module 420, interfaces that communicate dynamic signals use differential signaling, such as the PCIe interfaces and USB interfaces can be likely to generate crosstalk if placed adjacently in the second connector module 420 and, therefore, are placed separately in the second connector module 420. The interfaces that communicate static signals, such as the on-off switches and hard reset switches, can be less likely to generate interference if placed adjacently to the interfaces that communicate dynamic signals. As such, the second connector module 420 can include interfaces that communicate static signals between interfaces that communicate dynamic signals. This allows multiple interfaces to be included in the second connector module 420 while reducing interference between the multiple interfaces. The second connector module 420 can also include connections for low voltage power, such as 1.8V 444, 1.9V 446, and 2.8V 448. As some of the interfaces on the second connector module 420 may be more susceptible to power supply noise, the connections for low voltage power can be included in the second connector module 420 while a higher voltage power supply, such as VPH_PWR 418, can be included in the first connector module 410. It should be understood that the number of connectors can vary in accordance with different embodiments. The number of interfaces in the connectors and the arrangement of the interfaces in the connectors can vary in accordance with different embodiments.

In some embodiments, the first connector module 410 and the second connector module 420 can include various components to reduce interference between interfaces. The first connector module 410 and the second connector module 420 can include ground guards between the connections for the interfaces. The ground guards can serve to reduce interference between the interfaces. In some embodiments, the first connector module 410 and the second connector module 420 can include a reference ground. The reference ground can reduce the effects of any interference that may occur by providing a reference point from which voltages are measured.

Figure 5:
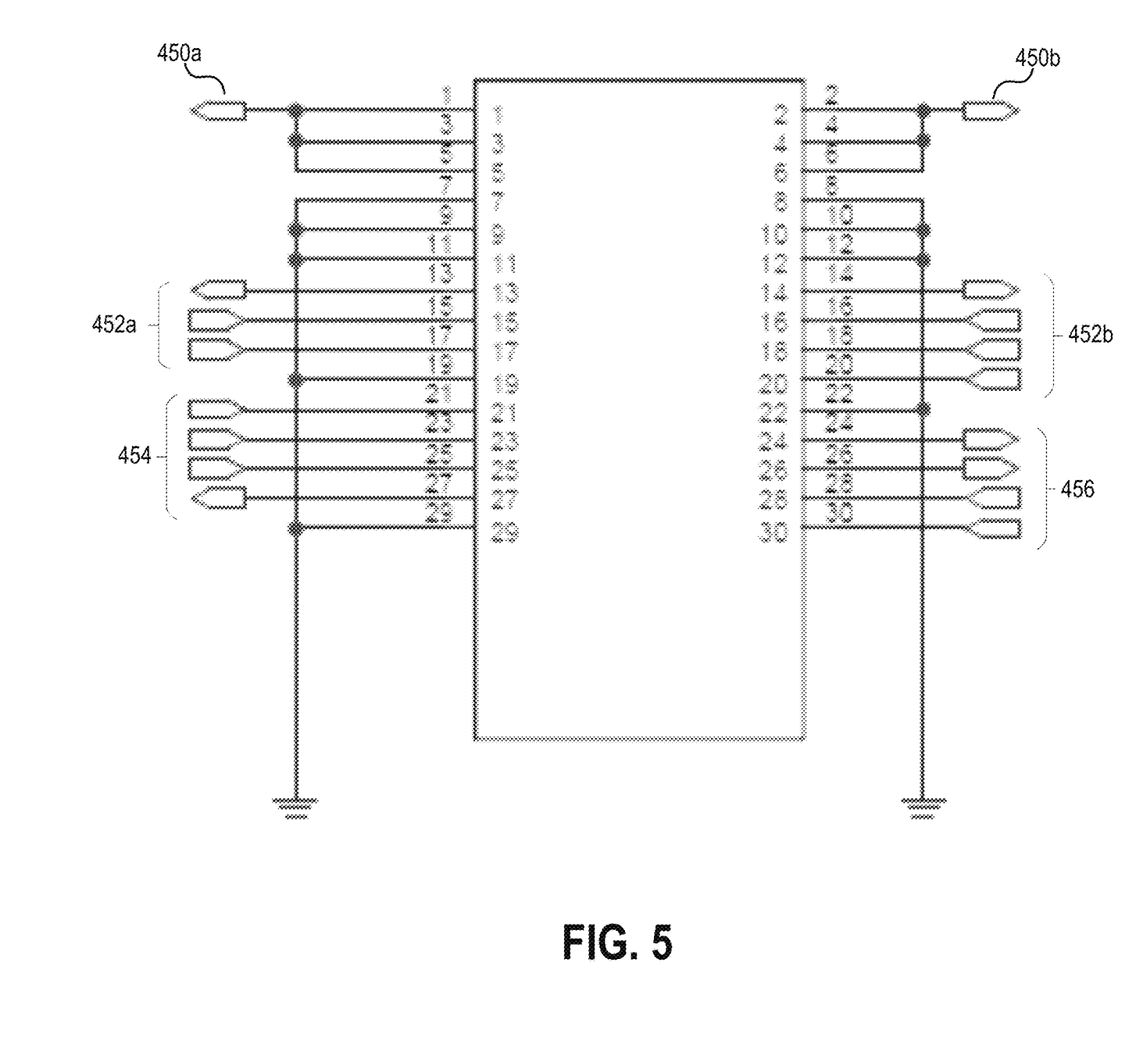
FIG. 5 illustrates a circuit diagram of an example connector module in accordance with one embodiment.

FIG. 5 illustrates a circuit diagram of an example connector module. As illustrated in FIG. 5, the example connector module has 30 pins. Pins 1, 2, 3, 4, 5, and 6 can be connectors for a power supply 450a, 450b. Pins 13-20 can be connectors for a SLIC SPI interface 452a, 452b. Pins 21, 23, 25, and 27 can be connectors for a SLIC PCM interface 454. Pins 24, 26, 28, and 30 can be connectors for a UART interface 458. In some embodiments, the example connector module can be implemented as the first connector module 410 of FIG. 4. For example, pins 1 and 2 for the power supply 450a, 450b can be implemented as the connectors for VPH_PWR 418 of FIG. 4. Pins 13-20 for the SLIC SPI interface 452a, 452b can be implemented as the connectors for SLIC_SPI 414 of FIG. 4. Pins 21, 23, 25, and 27 for the SLIC PCM interface 454 can be implemented as the connectors for SLIC_PCM 412. Pins 24, 26, 28, and 30 for the UART interface 458 can be implemented as the connectors for BT_UART 416 of FIG. 4.

Figure 6:
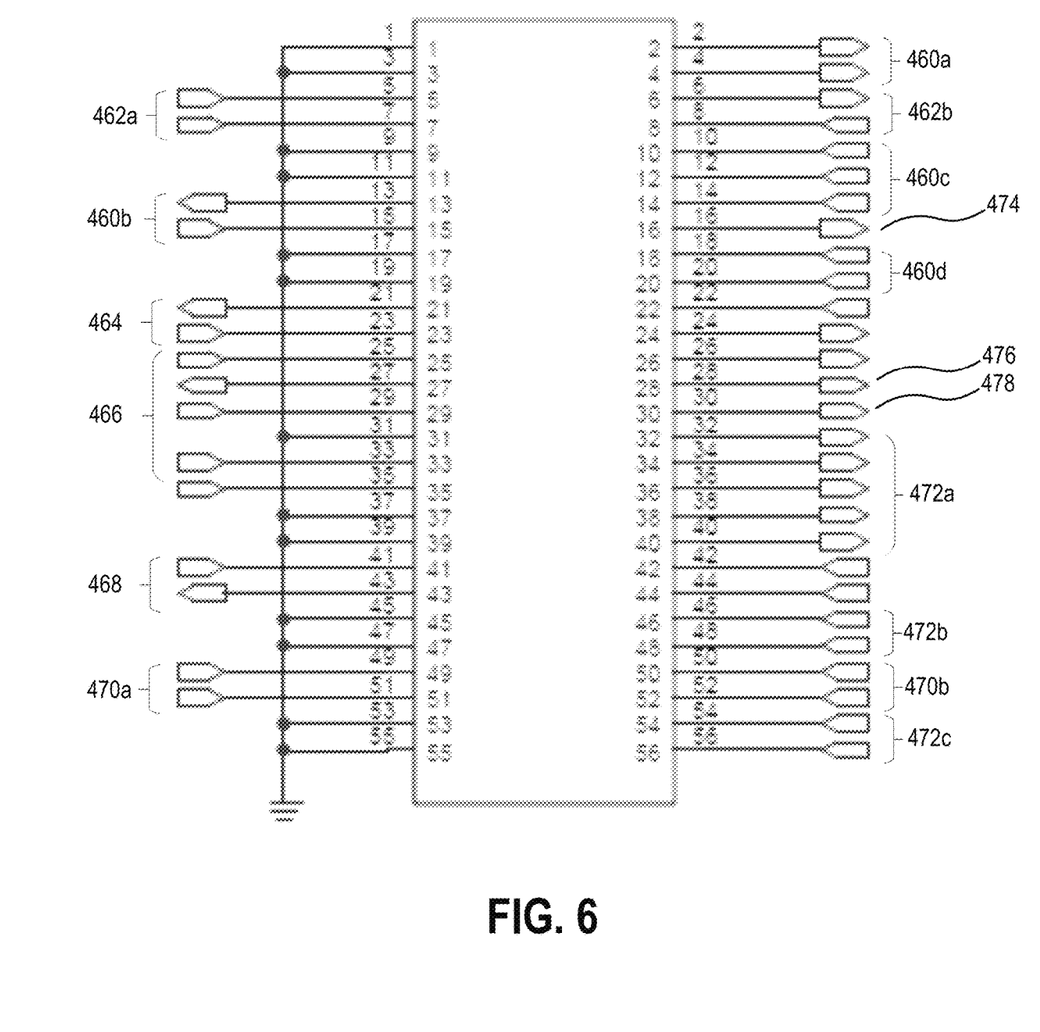
FIG. 6 illustrates a circuit diagram of an example connector module in accordance with one embodiment.

FIG. 6 illustrates a circuit diagram of an example connector module. As illustrated in FIG. 6, the example connector module has 56 pins. Pins 2, 4, 10, 12, 13, 14, 15, 18, and 20 can be connectors for a PCIe interface 460a, 460b, 460c, 460d. Pins 5-8 can be connectors for a first UIM interface 462a, 462b. Pins 21 and 23 can be connectors for a I2C interface 464. Pins 25, 27, 29, and 33 can be connectors for a second UIM interface 466. Pins 41 and 43 can be connectors for a UART interface 468. Pins 49-52 can be connectors for QTM interface 470a, 470b. Pins 32, 34, 36, 38, 46, 48, 54, and 56 can be connectors for a USB interface 472a, 472b, 472c. Pin 16 can be a connector for a first on-off switch 474. Pin 28 can be a connector for second on-off switch 476. Pin 30 can be a connector for a reset switch 478. In some embodiments, the example connector module can be implemented as the second connector module 420 of FIG. 4. For example, pins 2, 4, 10, 12, 13, 14, 15, 18, and 20 for the PCIe interface 460a, 460b, 460c, 460d can be implemented as the connectors for PCIe 424 of FIG. 4. Pins 5-8 for the first UIM interface 462a, 462b or pins 25, 27, 29, and 33 for the second UIM interface can be implemented as the connectors for UIM 424 of FIG. 4. Pins 21 and 23 for the I2C interface 464 can be implemented as the connectors for I2C 426 of FIG. 4. Pins 41 and 43 for the UART interface 468 can be implemented as the connectors for UART_TX/RX 428 of FIG. 4. Pins 49-52 for the QTM interface 470a, 470b can be implemented as the connectors for QTM_PON 430. Pins 32, 34, 36, 38, 46, 48, 54, and 56 for the USB interface 472a, 472b, 472c can be implemented as the connectors for USB_HS 440 and USB_SS 442 of FIG. 4. Pin 16 for the first on-off switch 474 can be implemented as the connector for PHONE_ON 432 of FIG. 4. Pin 28 for the second on-off switch 476 can be implemented as the connector for ON_OFF_SW_DET 436 of FIG. 4. Pin 30 for the reset switch 478 can be implemented as the connector for HARD_RESET 438 of FIG. 4.

Figure 7:
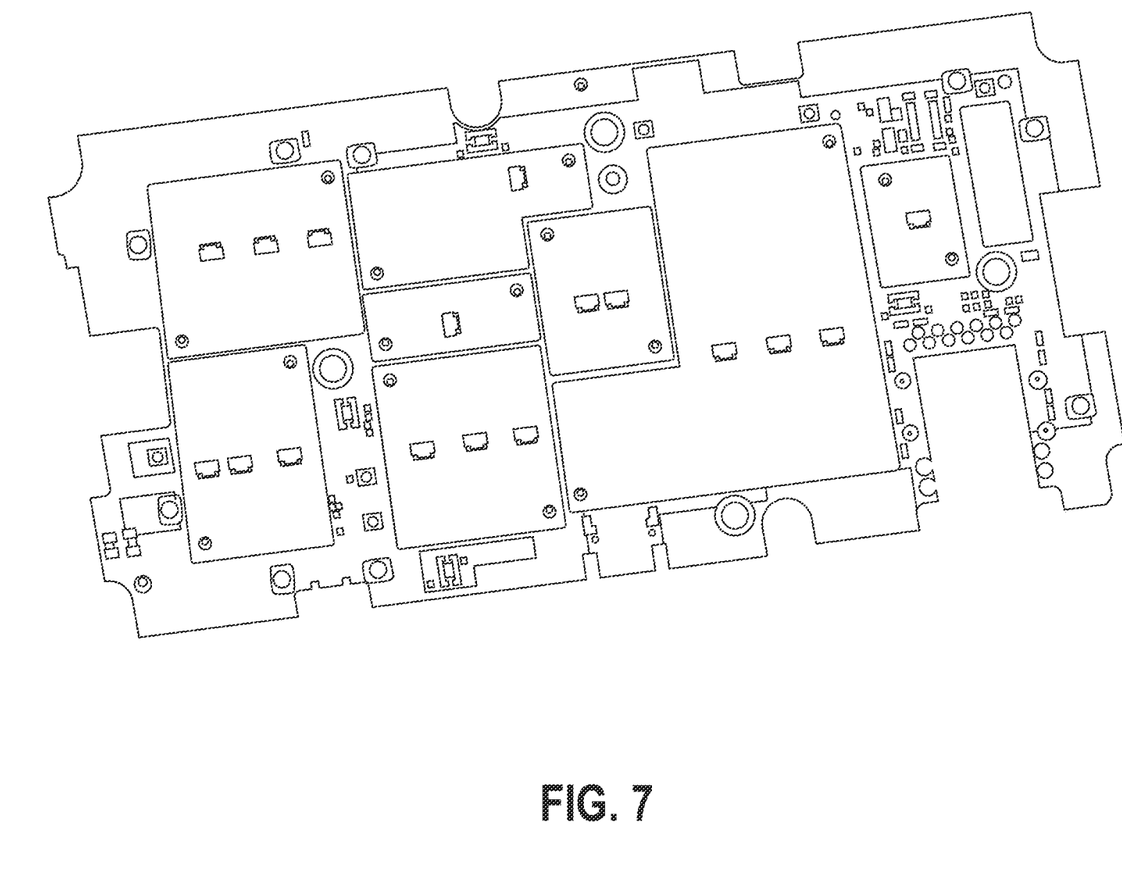
FIG. 7 illustrates an example cellular modem interface module in accordance with one embodiment.

FIG. 7 illustrates an example implementation of a cellular modem interface module in accordance with one embodiment. As illustrated in FIG. 7, the cellular modem interface module can include a memory, a processor, a cellular module, a first connector, and a second connector. It should be understood that the number of connectors can vary in accordance with different embodiments.

The terms "substantially" and "about" used throughout this disclosure, including the claims, are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The term "coupled" refers to direct or indirect joining, connecting, fastening, contacting or linking, and may refer to various forms of coupling such as physical, optical, electrical, fluidic, mechanical, chemical, magnetic, electro-magnetic, optical, communicative or other coupling, or a combination of the foregoing. Where one form of coupling is specified, this does not imply that other forms of coupling are excluded. For example, one component physically coupled to another component may reference physical attachment of or contact between the two components (directly or indirectly), but does not exclude other forms of coupling between the components such as, for example, a communications link (e.g., an RF or optical link) also communicatively coupling the two components. Likewise, the various terms themselves are not intended to be mutually exclusive. For example, a fluidic coupling, magnetic coupling or a mechanical coupling, among others, may be a form of physical coupling.

Figure 8:
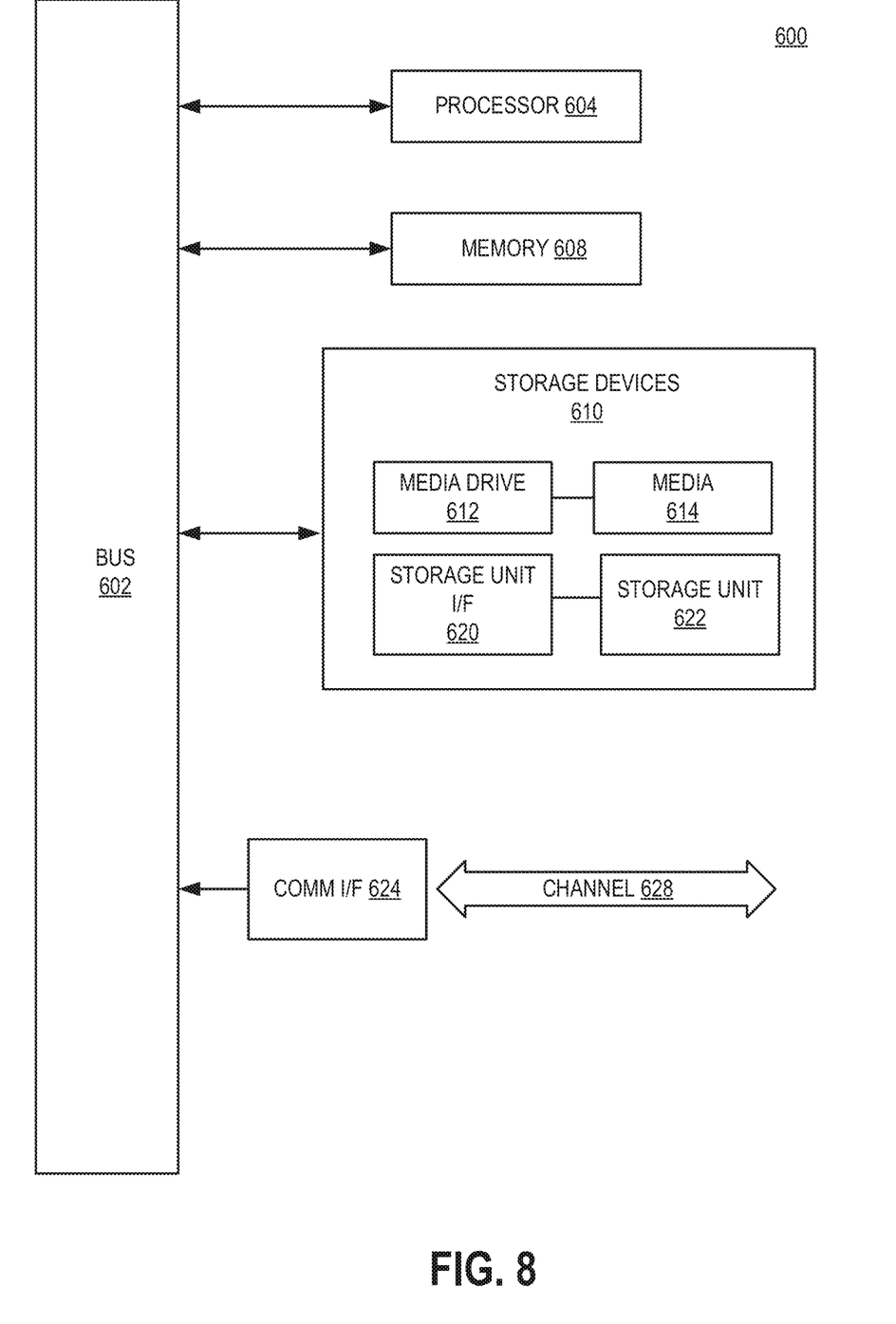
FIG. 8 illustrates an example of an example computing component that may be used in implementing various features of embodiments of the disclosed technology.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. In other words, as would be apparent to one of ordinary skill in the art after reading this description, the various features and functionality described herein may be implemented in any given application and can be implemented in one or more separate or shared circuits in various combinations and permutations. Even though various features or elements of functionality may be individually described or claimed as separate circuits, one of ordinary skill in the art will understand that these features and functionality can be shared among one or more common circuits, and such description shall not require or imply that separate circuits are required to implement such features or functionality.

Where circuits are implemented in whole or in part using software, in one embodiment, these software elements can be implemented to operate with a computing or processing system capable of carrying out the functionality described with respect thereto. One such example computing system is shown in FIG. 9. Various embodiments are described in terms of this example-computing system 600. After reading this description, it will become apparent to a person skilled in the relevant art how to implement the technology using other computing systems or architectures.

Referring now to FIG. 8, computing system 600 may represent, for example, computing or processing capabilities found within desktop, laptop and notebook computers; hand-held computing devices (smart phones, cell phones, palmtops, tablets, etc.); mainframes, supercomputers, workstations or servers; or any other type of special-purpose or general-purpose computing devices as may be desirable or appropriate for a given application or environment. Computing system 600 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 600 might include, for example, one or more processors, controllers, control modules, or other processing devices, such as a processor 604. Processor 604 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 604 is connected to a bus 602, although any communication medium can be used to facilitate interaction with other components of computing system 600 or to communicate externally.

Computing system 600 might also include one or more memory modules, simply referred to herein as main memory 608. For example, in some embodiments random access memory (RAM) or other dynamic memory, might be used for storing information and instructions to be executed by processor 604. Main memory 608 might also be used for storing temporary variables or other intermediate information during execution of instructions to be executed by processor 604. Computing system 600 might likewise include a read only memory ("ROM") or other static storage device coupled to bus 602 for storing static information and instructions for processor 604.

The computing system 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), a flash drive, or other removable or fixed media drive might be provided. Accordingly, storage media 614 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing system 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a flash drive and associated slot (for example, a USB drive), a PCMCIA slot and card, and other fixed or removable storage units 622 and interfaces 620 that allow software and data to be transferred from the storage unit 622 to computing system 600.

Computing system 600 might also include a communications interface 624. Communications interface 624 might be used to allow software and data to be transferred between computing system 600 and external devices. Examples of communications interface 624 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 608, storage unit 622, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 600 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various example embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described example embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of example block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A cellular modem interface device, comprising:
   a cellular module, comprising:
      wireless communication circuitry;
   a first connector module, comprising:
      a first plurality of connectors associated with a first plurality of interfaces, wherein the first plurality of connectors includes at least one connector for a first power supply and at least one interface of the first plurality of interfaces is associated with slow data speeds;
   a second connector module, comprising:
      a second plurality of connectors associated with a second plurality of interfaces, wherein at least one interface of the second plurality of interfaces is associated with fast data speeds, wherein a first group of connectors of the second plurality of connectors includes at least one connector of the second plurality of connectors corresponding with at least one interface of the second plurality of interfaces associated with a first static signal arranged between at least two connectors of the second plurality of connectors corresponding with at least two interfaces of the second plurality of interfaces associated with differential signaling, wherein a second group of connectors of the second plurality of connectors includes at least one connector of the second plurality of connectors corresponding with at least one interface of the second plurality of interfaces associated with a second static signal arranged between at least two connectors of the second plurality of connectors corresponding with at least two interfaces of the second plurality of interfaces associated with differential signaling, and wherein at least one connector of the second plurality of connectors corresponding with at least one interface of the second plurality of interfaces associated with a third static signal is arranged between the first group of connectors and the second group of connectors.

2. The cellular modem interface device of claim 1, wherein the cellular module further comprises a plurality of antenna, wherein the plurality of antenna are associated with at least one of: LTE, WCDMA, GPS, GNSS, 3G, 4G, or 5G frequencies.

3. The cellular modem interface device of claim 1, wherein the cellular module further comprises at least four antenna ports.

4. The cellular modem interface device of claim 1, wherein the first plurality of interfaces includes a SLIC interface and a UART interface.

5. The cellular modem interface device of claim 1, wherein the second plurality of interfaces includes at least a PCIe interface and a USB interface.

6. The cellular modem interface device of claim 1, wherein the at least one interface of the second plurality of interfaces associated with the first static signal includes at least one of: an on-off switch or a hard reset switch.

7. The cellular modem interface device of claim 1, wherein the second plurality of connectors includes at least one connector for a second power supply and the second power supply is associated with a lower voltage than the first power supply.

8. The cellular modem interface device of claim 1, wherein the first connector module further comprises a first plurality of ground guards and the second connector module further comprises a second plurality of ground guards.

9. The cellular modem interface device of claim 1, wherein the first connector module further comprises a first reference ground and the second connector module further comprises a second reference ground.

10. A connector module comprising:
a plurality of connectors for a plurality of interfaces, wherein the plurality of connectors are arranged based on factors associated with the plurality of interfaces, wherein the factors include a type of signal associated with the plurality of interfaces, wherein a first group of connectors of the plurality of connectors includes at least one connector corresponding with at least one interface associated with a first static signal arranged between at least two connectors of the plurality of connectors corresponding with at least two interfaces associated with differential signaling, wherein a second group of connectors of the plurality of connectors includes at least one connector corresponding with at least one interface associated with a second static signal arranged between at least two connectors of the plurality of connectors corresponding with at least two interfaces associated with differential signaling, and wherein at least one connector of the plurality of connectors corresponding with at least one interface of the plurality of interfaces associated with a third static signal is arranged between the first group of connectors and the second group of connectors.

11. The connector module of claim 10, wherein the plurality of connectors includes a first connector for a power supply and at least one second connector for at least one interface of the plurality of interfaces, wherein the at least one interface is associated with slow data speeds.

12. The connector module of claim 10, wherein the plurality of connectors includes a third connector for low voltage power and at least one fourth connector for at least one interface of the plurality of interfaces, wherein the at least one interface is associated with fast data speeds.

13. The connector module of claim 10, wherein the plurality of interfaces includes a SLIC interface and a UART interface.

14. The connector module of claim 10, wherein the the plurality of interfaces includes a PCIe interface and a USB interface.

15. The connector module of claim 10, wherein the at least one interface associated with the first static signal is an on-off switch or a hard reset switch.

16. The connector module of claim 10, further comprising a plurality of ground guards.

17. The connector module of claim 10, further comprising a reference ground.

18. A method for arranging a plurality of connectors associated with a plurality of interfaces in a cellular modem interface device comprising:
arranging the plurality of connectors based on factors associated with the plurality of interfaces, wherein the factors include a type of signal associated with the plurality of interfaces, wherein a first group of connectors of the plurality of connectors includes at least one connector corresponding with at least one interface associated with a first static signal arranged between at least two connectors of the plurality of connectors corresponding with at least two interfaces associated with differential signaling, wherein a second group of connectors of the plurality of connectors includes at least one connector corresponding with at least one interface associated with a second static signal arranged between at least two connectors of the plurality of connectors corresponding with at least two interfaces associated with differential signaling, and wherein at least one connector of the plurality of connectors corresponding with at least one interface of the plurality of interfaces associated with a third static signal is arranged between the first group of connectors and the second group of connectors.

19. The method of claim 18, wherein the factors include signal integrity or susceptibility to interference from other interfaces.

20. The method of claim 18, wherein the cellular modem interface device includes a 5G modem.

* * * * *